US011893220B1

(12) United States Patent
Silverstein et al.

(10) Patent No.: US 11,893,220 B1
(45) Date of Patent: Feb. 6, 2024

(54) GENERATING AND MODIFYING GRAPHICAL USER INTERFACE ELEMENTS

(71) Applicant: INTERNATIONAL BUSINESS MACHINES CORPORATION, Armonk, NY (US)

(72) Inventors: Zachary A. Silverstein, Georgetown, TX (US); Logan Bailey, Atlanta, GA (US); Su Liu, Austin, TX (US); Kenneth C Accetta, Cornelius, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/334,834

(22) Filed: Jun. 14, 2023

(51) Int. Cl.
*G06F 3/04845* (2022.01)
*G06F 16/9035* (2019.01)
*G06F 16/904* (2019.01)

(52) U.S. Cl.
CPC ........ *G06F 3/04845* (2013.01); *G06F 16/904* (2019.01); *G06F 16/9035* (2019.01)

(58) Field of Classification Search
CPC ................. G06T 19/20; G06T 2210/04; G06T 2219/008; G06T 2219/2004; G06T 2219/2016; G06F 30/12; G06F 3/04815; G06F 3/04845
See application file for complete search history.

(56) References Cited

U.S. PATENT DOCUMENTS

| 8,990,105 | B1 | 3/2015 | Shatkin-Margolis |
| 10,460,235 | B1 * | 10/2019 | Truong ............... G06F 11/3636 |
| 11,269,498 | B2 | 3/2022 | Barak |

(Continued)

FOREIGN PATENT DOCUMENTS

| CN | 101582009 A | 11/2009 |
| CN | 111144952 A | 5/2020 |
| CN | 111612496 A | 9/2020 |

OTHER PUBLICATIONS

Disclosed Anonymously, "Generating Icons for Applications in an Applications Marketplace", IP.com, IPCOM000252089D, Dec. 15, 2017, 35 pages.

(Continued)

*Primary Examiner* — Tadesse Hailu
(74) *Attorney, Agent, or Firm* — Daniel G. DeLuca

(57) ABSTRACT

An embodiment for generating and modifying graphical user interface elements based on user item interests. The embodiment may detect a user interacting with a connected application. The embodiment may determine item interests of the detected user. The embodiment may generate and store a personalized user profile based on the determined item interests of the user. The embodiment may, in response to detecting a query made by the user, extract from the detected query interest topics, subject matter, and a series of associated key terms. The embodiment may determine a highest-prioritized key term. The embodiment may identify a first GUI element displayed by the connected application based on the detected query. The embodiment may generate, using a generative adversarial network (GAN), a custom GUI element based on the highest-prioritized key term. The embodiment may replace the first GUI element with the custom GUI element.

20 Claims, 3 Drawing Sheets

(56) References Cited

U.S. PATENT DOCUMENTS

| | | | |
|---|---|---|---|
| 11,513,869 B2* | 11/2022 | Goodsitt | G06F 18/22 |
| 2006/0074769 A1 | 4/2006 | Looney | |
| 2009/0222551 A1* | 9/2009 | Neely | G06F 16/951 |
| | | | 709/224 |
| 2009/0254971 A1* | 10/2009 | Herz | G06Q 10/10 |
| | | | 726/1 |
| 2017/0178217 A1* | 6/2017 | Ahuja | H04W 4/02 |
| 2017/0250930 A1* | 8/2017 | Ben-Itzhak | G06F 3/0488 |
| 2023/0224540 A1* | 7/2023 | Kodali | G06Q 40/08 |
| | | | 725/34 |

OTHER PUBLICATIONS

Neurosys, "The first AI-generated visual identity", https://neurosys.com/case-studies/the-first-ai-generated-visual-identity, Accessed Apr. 11, 2023, 5 Pages.

Oeldorf, et al., "LoGANv2: Conditional Style-Based Logo Generation with Generative Adversarial Networks", 2019 18th IEEE international Conference on Machine Learning and Applications (ICMLA), pp. 462-468.

Yao et al., "An Automatic GUI Generation Method Based on Generative Adversarial Network", Proceedings of Seventh International Congress on Information and Communication Technology, Jul. 12, 2022, 15 Pages. https://link.springer.com/chapter/10.1007/978-981-19-2394-4_59.

* cited by examiner

GENERATING AND MODIFYING GRAPHICAL USER INTERFACE ELEMENTS

BACKGROUND

The present application relates generally to computers, and more particularly, to generating and modifying graphical user interface elements based on user item interests.

In modern competitive business landscapes, many businesses utilize graphical user interface (GUI) elements, such as logos or icons, to provide potential customers with visual representations of a given product, service, feature, or other offering. Highly effective GUI elements may serve as valuable tools to captivate users, establish meaningful connections, and drive desired user behavior, leading to improved overall performance and business success. Accordingly, businesses consistently and continuously strive to create, select, and improve GUI elements across all their products, services, and offerings.

SUMMARY

According to one embodiment, a method, computer system, and computer program product for generating and modifying graphical user interface elements based on user item interests is provided. The embodiment may include detecting and authenticating a user interacting with a connected application. The embodiment may also include determining item interests of the user based on at least one or more of user purchase history, user interests, and user digital behaviors. The embodiment may further include generating and storing a personalized user profile based on the determined item interests of the user, wherein the personalized user profile includes a list of user items of interest and associated keywords, the personalized user profile being updated in real-time based on user interaction data from the connected application. The embodiment may also include, in response to detecting a query made by the user, extracting from the detected query interest topics, subject matter, and a series of associated key terms. The embodiment may further include, determining a highest-prioritized key term within the series of associated key terms. The embodiment may also include identifying a first GUI element displayed by the connected application based on the detected query. The embodiment may further include generating, using a generative adversarial network (GAN), a custom GUI element based on the highest-prioritized key term. The embodiment may also include replacing the first GUI element with the generated custom GUI element.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
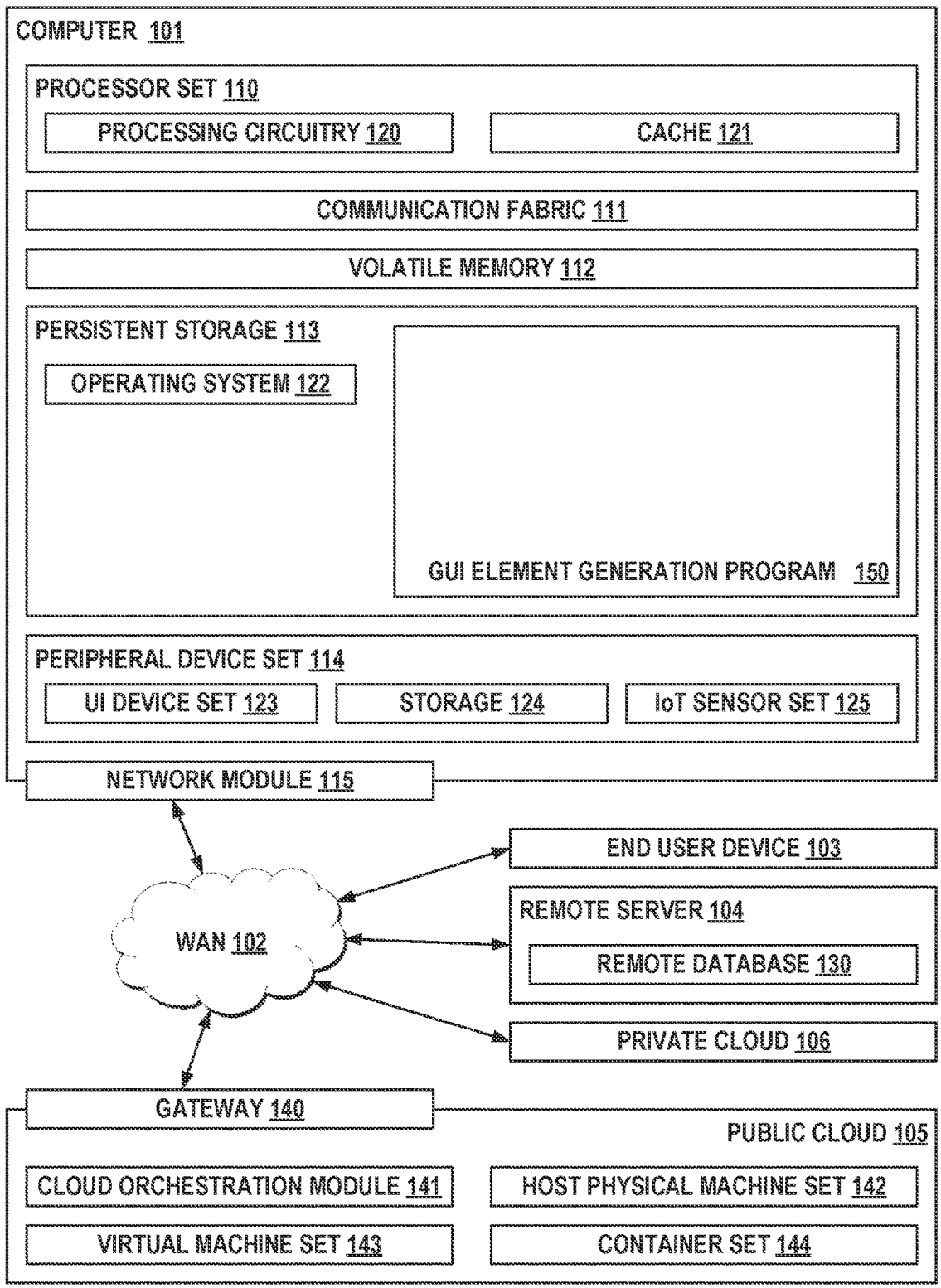
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate relates generally to computers, and more particularly, to generating and modifying graphical user interface elements based on user item interests. The following described exemplary embodiments provide a system, method, and program product to, among other things, detect and authenticate a user interacting with a connected application, determine item interests of the user based on at least one or more of user purchase history, user interests, and user digital behaviors, generate and store a personalized user profile based on the determined item interests of the user, wherein the personalized user profile includes a list of user items of interest and associated keywords, the personalized user profile being updated in real-time based on user interaction data from the connected application, and, in response to detecting a query made by the user, extract from the detected query interest topics, subject matter, and a series of associated key terms. Thereafter, presently described exemplary embodiments may determine a highest-prioritized key term within the series of associated key terms, identify a first GUI element displayed by the connected application based on the detected query, generate, using a generative adversarial network (GAN), a custom GUI element based on the highest-prioritized key term, and replace the first GUI element with the generated custom GUI element. Therefore, the presently described embodiments have the capacity to improve methods for using computers to generate and modify graphical user interface elements based on user item interests, or in some embodiments, based on vendor priorities. By determining highest prioritized key terms, described embodiments can leverage a GAN to generate customized GUI elements that are more effective, and that are more specific to involved users and vendors. This may allow for generic GUI elements to automatically be replaced with more effective customized GUI elements to drive increased amounts of desired user behavior (click through rates, conversion rates, etc.) and improved business outcomes. The automated nature of the described embodiments further eliminates the time and significant costs associated with manual generation of GUI elements.

As previously described, in modern competitive business landscapes, many businesses utilize graphical user interface (GUI) elements, such as logos or icons, to provide potential customers with visual representations of a given product, service, feature, or other offering. Highly effective GUI elements may serve as valuable tools to captivate users, establish meaningful connections, and drive desired user behavior, leading to improved overall performance and business success. Accordingly, businesses consistently and continuously strive to create, select, and improve GUI elements across all their products, services, and offerings.

However, many businesses face challenges related to creating specific GUI elements associated with increasingly large numbers of products and offerings. Creating these GUI elements is a time-intensive and manual task associated with significant costs. Even if a business does invest the time and resources to create specific GUI elements, they are generally generic in nature, and unrelated to specific interests or preferences of individual users. Furthermore, generic GUI elements are typically equally unrelated to the interest or preferences of the business (or vendor) regarding a given product, service, or offering. In turn, many businesses are currently unable to leverage highly effective customizable GUI elements, instead relying upon generic GUI elements that are unrelated to the interest or preferences of a given user or vendor.

Accordingly, a method, computer system, and computer program product for generating and modifying graphical user interface elements based on user product interests is provided. The method, system, and computer program product may detect and authenticate a user interacting with a connected application. The method, system, computer program product may determine item interests of the user based on at least one or more of user purchase history, user interests, and user digital behaviors. The method, system, computer program product may generate and store a personalized user profile based on the determined item interests of the user, wherein the personalized user profile includes a list of user items of interest and associated keywords, the personalized user profile being updated in real-time based on user interaction data from the connected application. The method, system, computer program product may then, in response to detecting a query made by the user, extract from the detected query interest topics, subject matter, and a series of associated key terms. The method, system, computer program product may then determine a highest-prioritized key term within the series of associated key terms. Next, the method, system, computer program product may identify a first GUI element displayed by the connected application based on the detected query. Then the method, system, computer program product may generate, using a generative adversarial network (GAN), a custom GUI element based on the highest-prioritized key term. Thereafter, the method, system, computer program product may replace the first GUI element with the generated custom GUI element. In turn, the method, system, computer program product has provided improved methods for using computers to generate and modify graphical user interface elements based on user product interests, or in some embodiments, also based on vendor priorities. By determining highest prioritized key terms, described embodiments can leverage a GAN to generate customized GUI elements that are more effective, and that are more specific to involved users and vendors. This may allow for generic GUI elements to automatically be replaced with more effective customized GUI elements to drive increased amounts of desired user behavior (click through rates, conversion rates, etc.) and improved business outcomes. The automated nature of the described embodiments further eliminates the time and significant costs associated with manual generation of GUI elements.

Presently described embodiments may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as GUI element generation program 150. In addition to GUI element generation code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and GUI element generation code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in GUI element generation code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in GUI element generation code 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the GUI element generation program 150 may be a program capable of detecting and authenticating a user interacting with a connected application. Next, GUI element generation program 150 may determine item interests of the user based on at least one or more of user purchase history, user interests, and user digital behaviors. GUI element generation program 150 may then generate and store a personalized user profile based on the determined item interests of the user, wherein the personalized user profile includes a list of user items of interest and associated keywords, the personalized user profile being updated in real-time based on user interaction data from the connected application. GUI element generation program 150 may then, in response to detecting a query made by the user, extract from the detected query interest topics, subject matter, and a series of associated key terms. Next, GUI element generation program 150 may determine a highest-prioritized key term within the series of associated key terms. GUI element generation program 150 may then identify a first GUI element displayed by the connected application based on the detected query. Next, GUI element generation program 150 may generate, using a generative adversarial network (GAN), a custom GUI element based on the highest-prioritized key term. Thereafter, GUI element generation program 150 may replace the first GUI element with the generated custom GUI element. Described embodiments thus provide for improved methods for using computers to generate and modify graphical user interface elements based on a given user's product interests, or in some embodiments, based on vendor priorities. By determining highest prioritized key terms, described embodiments can leverage a GAN to generate customized GUI elements that are more effective, and that are more specific to involved users and vendors. This may allow for generic GUI elements to automatically be replaced with more effective customized GUI elements to drive increased amounts of desired user behavior (click through rates, conversion rates, etc.) and improved business outcomes. The automated nature of the described embodiments further eliminates the time and significant costs associated with manual generation of GUI elements.

Figure 2:
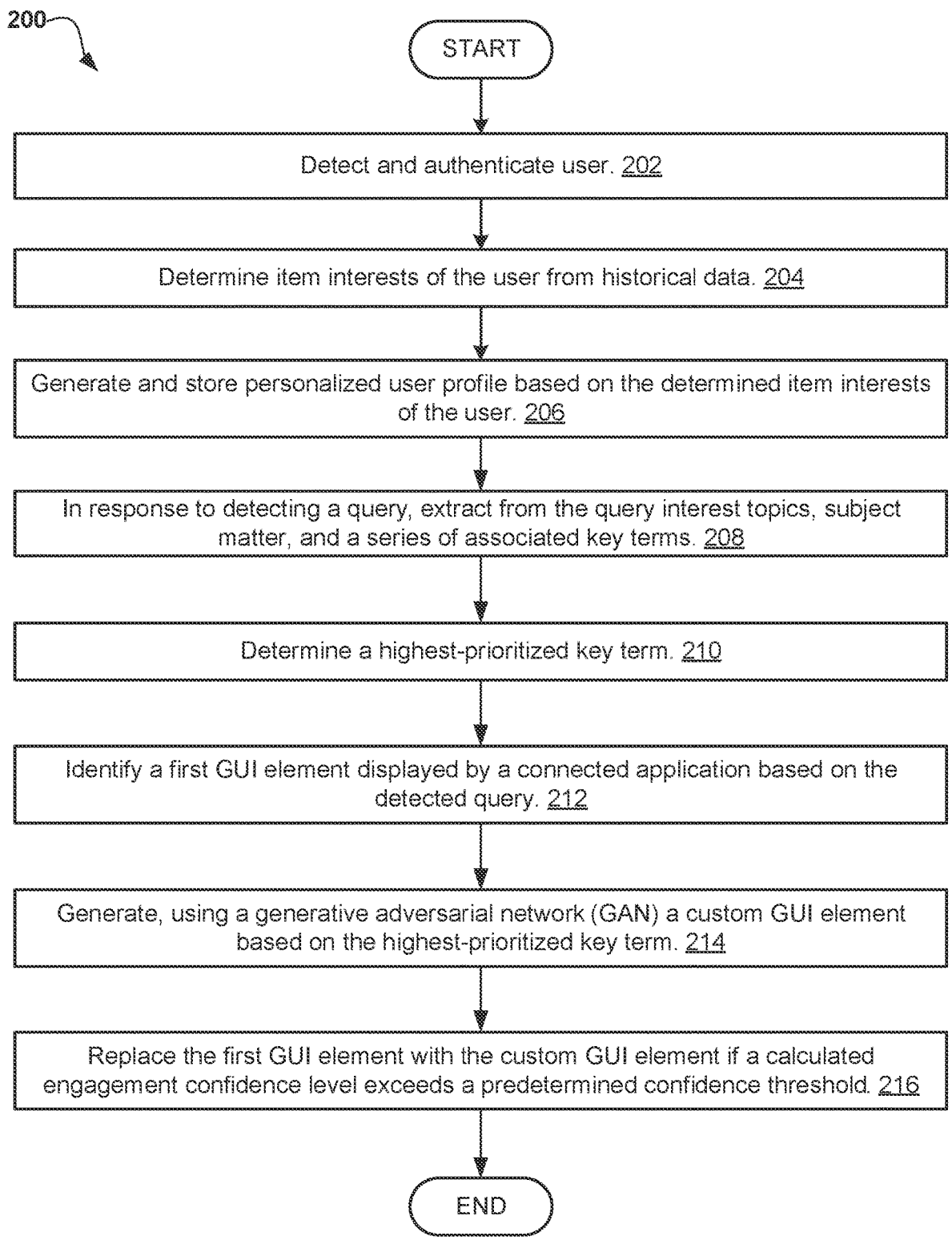
FIG. 2 illustrates an operational flowchart for a process of generating and modifying graphical user interface elements based on user item interests according to at least one embodiment.
Figure 3:
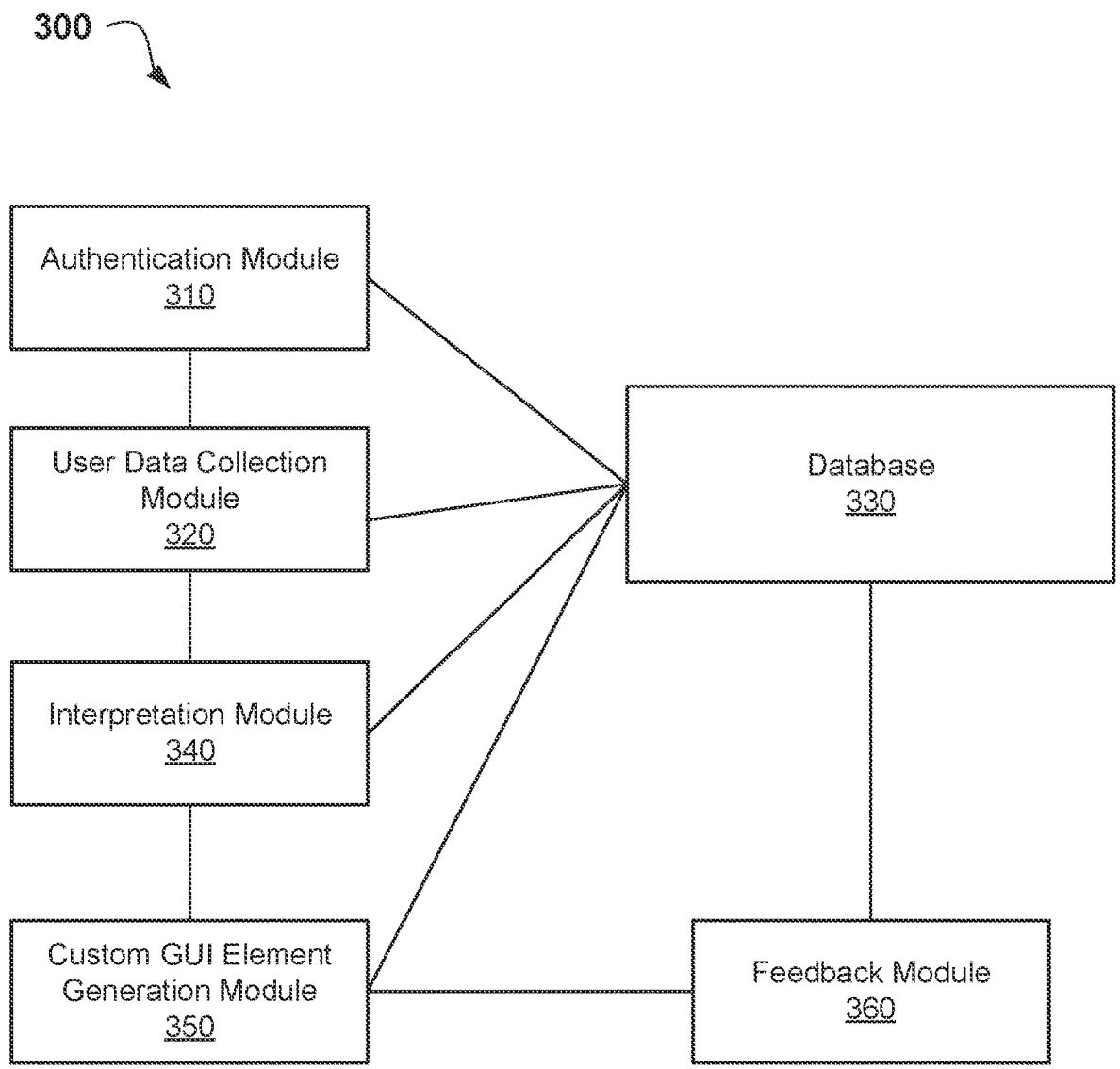
FIG. 3 illustrates exemplary system architecture that may be utilized to perform illustrative processes for generating and modifying graphical user interface elements based on user item interests according to at least one embodiment.

Referring now to FIG. 2, an operational flowchart for a process 200 of generating and modifying graphical user interface elements based on user item interests according to at least one embodiment is provided. FIG. 3 depicts exemplary system architecture 300 that may be utilized by an exemplary GUI element generation program 150 to perform illustrative processes for generating and modifying graphical user interface elements based on user item interests according to at least one embodiment. FIG. 3 includes an authentication module 310, a user data collection module 320, an interpretation module 340, a custom GUI element generation module, and a feedback module 360, each of which are configured to access and communicate with an accessible database 330. Details of how an illustrative GUI element generation program 150 may utilize the system architecture 300 shown in FIG. 3 will be described in greater detail below in connection with the description of illustrative process 200 in FIG. 2.

At 202, GUI element generation program 150 may detect and authenticate a user interacting with a connected application. In embodiments, GUI element generation program 150 may be employed with or connected with any suitable consumer, commercial, or other type of application. An exemplary authentication module 310 of, GUI element generation program 150 may be configured to access and leverage data from the connected application. At this step, for example, GUI element generation program 150 may utilize exemplary authentication module 310, as shown in FIG. 3, to detect and authenticate a user that is interacting with a connected application. In embodiments, the authentication module 310 may be configured to leverage and communicate with any suitable or desired authentication tools integrated into the connected application. For example, at this step, GUI element generation program 150 may be connected to an illustrative application 'C1'. GUI element generation program 150 may then leverage authentication module 310 to detect that an exemplary user 'U1' is interacting with an integrated authentication tool, such as, for example, OAuth2, which is employed by and integrated with connected application 'C1' related to ordering food items or products. Once the user has been detected, GUI element generation program 150 may then proceed with authenticating the user and proceeding with illustrative process 200. In embodiments, data related to the performance of step 202 may be stored within an exemplary accessible database 330.

Next, at 204, GUI element generation program 150 may determine item interests of the user based on at least one or more of user purchase history, user interests, and user digital behaviors. At this step, GUI element generation program 150 may leverage an exemplary user data collection module 320, as shown in FIG. 3, to leverage historical data related to the detected user to determine item interests of the user based on the detected user's purchase history, interests, and any other digital behaviors that may be collected and tracked by the connected application. In the context of this disclosure, user item interests may refer to one or more of products, services, or any other offerings that a user may interact with in any way. User data collection module 320 of GUI element generation program 150 may utilize any suitable web analytics tools to collect and process the user data described above. For example, at this step, user data collection module 320 of GUI element generation program 150 may utilize exemplary web analytics tools 'T1' to process purchase history data, item interest data, and other data related to digital behaviors on the connected application associated with user 'U1' detected and authenticated at step 202. The processed data may include various information related to user 'U1', such as for example, historical queries or searched performed, historical purchases made, historical product pages accessed, and any other suitable information related to user 'U1' and their interactions while navigating the connected consumer application. In embodiments, data collection module 320 may be further configured to, upon receiving permission from the user via the above-described authentication process, collect additional basic user information from the user's device or other accessible applications. Additional basic user information may include, for example, user demographic information, user location, and any other useful user data. In embodiments, data related to the performance of step 204 may be stored within an exemplary accessible database 330.

At 206, GUI element generation program 150 may generate and store a personalized user profile based on the determined item interests of the user, wherein the personalized user profile includes a list of user items of interest and associated keywords, the personalized user profile being updated in real-time based on user interaction data from the connected application. At this step, an exemplary interpretation module 340 shown in FIG. 3 may be used by GUI element generation program 150 to process the determined item interests from step 204 to generate a personalized user profile for the detected user. In embodiments, interpretation module 340 may be configured to further incorporate a list of user items of interest (items or products that a user historically has purchased or interacted with) and associated keywords into the generated personalized user profile. Returning to the previous example, at this step interpretation module 340 of GUI element generation program 150 may process the determined item interests for detected user to generate an exemplary personal user profile 'UP1' which may further include a list of items of interest represented by 'P1', 'P2', and 'P3' as well as a list of one or more keywords represented by 'K1', 'K2', and 'K3' associated with each of the respective items of interest. In embodiments, interpretation module 340 may be configured to leverage natural language processing techniques, such as Latent Dirichlet Allocation (LDA), Latent Semantic Analysis (LSA), and Word Embedding tools (Word2Vec, GloVe) and other suitable techniques and tools to retrieve one or more of interest topics, keywords or key terms associated with the user items of interest and interaction data corresponding to the user. For example, if the determined item of interests for an exemplary user 'U1' include interests corresponding to Italian food and restaurants, and historical purchases of item 'P1' corresponding to a pizza from a specific Italian restaurant, then interpretation module 340 of GUI element generation program 150 may leverage natural language processing tools to identify a series of associated keywords that may include 'Pizza', 'Italian Cuisine' and 'pasta'.

In embodiments, interpretation module 340 of an illustrative GUI element generation program 150 may generate the personalized user profiles which identify the user interest and behavior patterns by analyzing available data using any suitable machine learning techniques, such as, for example, suitable clustering techniques (such as K-means, hierarchical clustering), or suitable classification techniques (Decision Tree, Random Forest, Support Vector Machine, etc.). For example, if the exemplary user 'U1', referenced above, historically searches for 'Italian Cuisine', but then consistently purchases a specific item 'P1' associated with a pizza, the key term of 'Italian Cuisine' may be a less useful key term to associated with the user item of interest 'P1' to rely upon for generating a GUI element at later steps. Accordingly, interpretation module 340 may leverage machine learning techniques to identify more defined clusters based on information from a larger sample size of users on the connected application by leveraging their order histories, restaurant selections, and other historical data. Accordingly, if the trends observed in the historical data associated with user 'U1' are observed with many other users, then more defined clusters based on this trend may be observed, leading to a more useful key term for a given item of interest. Thus, the generated user profile will include associated key terms for each user items of interest that are not solely derived from the applied natural language processing tools. In embodiments, data related to the performance of step 206 may be stored within an exemplary accessible database 330. In embodiments, the generated personal user profiles may be stored in any suitable format, such as for example, JSON format.

In embodiments, interpretation module 340 of GUI element generation program 150 may be further configured to continuously interpret and process user interaction data from the connected application to continuously update the personalized user profile in real time. The user interaction data from the connected application may include data involving similar information to what is used to generate the personalized profile in the first instance, such as, for example, queries or searches performed, purchases made, product pages accessed, and any other suitable information related to user that may be collected and stored by the connected consumer application. In embodiments, data related to the performance of step 204 may be stored within an exemplary accessible database 330. Accordingly, GUI element generation program 150 has now processed and stored data and information associated with a user that may be leveraged to generate custom GUI elements at later steps upon receiving future queries.

Next, at 208, GUI element generation program 150 may, in response to detecting a query made by the user, extract from the detected query interest topics, subject matter, and a series of associated key terms. At this step interpretation module 340 of GUI element generation program 150 may, for example, detect a query 'Q1' made by user 'U1'. Interpretation module 340 of GUI element generation program 150 may then utilize the natural language processing tools and machine learning techniques discussed above to extract from the detected query 'Q1' interest topics, subject matter, and a series of associated key terms. The interest topics, subject matter, and series of associated key terms extracted from the query will subsequently be leveraged to identify relevant products or offerings in the connected application that are related to the detected query 'Q1', and then compare those identified products or offerings to the personalized user profile generated at 206. For example, if interpretation module 340 of GUI element generation program 150 detects a query 'Q1' from an exemplary user 'U1' that states 'Italian Cuisine near me', interpretation module 340 may leverage natural language processing tools to process query 'Q1' to identify relevant interest topics and subject matter, in this case language related to 'Italian Cuisine', as well as associated key terms.

In the context of this step, interest topics and subject matter identifiable by interpretation module 340 may relate to any relevant businesses, products, services, or other offerings, that may be associated with a received query. In embodiments, the interest topics and subject matter may be tiered or organized in any desirable way based on the organization within the connected application. For example, in some embodiments interest topics may correspond to a broader set of categories or offerings within the connected application, while subject matter may relate to specific products or businesses that offer specific products. For example, for exemplary query 'Q1' stating 'Italian Cuisine near me' interpretation module 340 may leverage natural language processing tools to extract an 'interest topic' within the connected application corresponding to 'Restaurants' based on the natural language processing of the phrase 'cuisine', as other available interest topics within the connected application may be irrelevant to the query 'Q1', such as, for example, 'Bars' or 'Coffee and Tea'. Then, interpretation module 340 may further extract from query 'Q1' subject matter' including various specific restaurants or restaurant types including but not limited to pizza restaurants, fine dining Italian restaurants, fast food pizza restaurants, as well as numerous potential food items associated with the phrase 'Italian Cuisine' offered by the various restaurant types, which may include many of the food products sold by the respective extracted restaurant types. Interpretation module 340 may then extract a series of associated key terms corresponding to the identified subject matter (in this case the restaurants and food products) such as 'pasta' 'calzones' 'pizza' 'fast food' etc. While the broad nature of the query 'Q1' for 'Italian Cuisine near me' may indicate that a user is searching for any number of food items, the personalized user profile and historical data processed in previous steps may be leveraged to identify which specific subject matter, and associated keywords, the user is more likely to be interested in. Accordingly, GUI element generation program 150 will, in the next step, prioritize the extracted key terms from the query to narrow down the most appropriate products and offerings.

Accordingly, at 210, GUI element generation program 150 may determine a highest-prioritized key term within the series of associated key terms. To accomplish this, interpretation module 340 of GUI element generation program may rank or score the extracted key terms based on the personalized user profile and associated data collected in previous steps. In embodiments, interpretation module 340 may further be configured to incorporate vendor or application priorities based on vendor advertisement priorities or preferred user interaction paths in its determination of priority for the key terms. For example, interpretation module 340 may be configured to take into consideration advertisement spend rankings of certain key terms, or to assign certain weights to vendor-preferred terms that are associated with leading the user towards a certain interaction path. In other embodiments, the vendor priorities may correspond to ensuring that key terms associated with businesses that have paid for improved visibility and ranking during the user search process are prioritized and scored appropriately. In embodiments, interpretation module 340 of GUI element generation program 150 may rank or assign scores to each of the extracted key terms within the series of associated key terms from the received query from step 208. For example, if for exemplary query 'Q1' from user 'U1' the set of extracted key terms extracted by interpretation module 340 include 'pizza', 'calzone' and 'pasta', interpretation module 340 may rank and assign scores to each of the extracted key terms based on the personalized user profile (and data therein) and vendor priorities for preferred user interaction paths. Accordingly, if key term 'pizza' is associated with items that, according to the generated personalized user profile, user 'U1' historically executes a purchase on, and is further associated with vendor priorities and advertisement spend ranking data for a same or similar key term, then it will be assigned a relatively high ranking or score by interpretation module 340. Thus, if user 'U1' typically purchases a pizza when searching for 'Italian cuisine near me', and there are relevant vendor priorities, in this case, for example, certain pizza restaurants that have paid the connected application for higher visibility and ranking for searches related to the key term 'pizza', then interpretation module 340 will score the key term 'pizza' with a relatively high value. In comparison, if exemplary key terms 'pasta' and 'calzone' are not associated with favorable data from the generated personalized user profile or with relevant vendor priority data, then interpretation module 340 will rank or score each of these key terms with a relatively lower priority value. The determined priority for each of the key terms calculated by interpretation module 340 of GUI element generation program 150 may be represented numerically and normalized for ease of interpretation. For example, for the example above, interpretation module 340 of GUI element generation program 150 may determine a highest-prioritized key term 'pizza' that had a calculated score of 9.8 based on a numerical score that is normalized to be between 0 and 10, with 10 being a highest priority score and 0 being a lowest priority score. In embodiments, data related to the performance of step 210 may be stored within an exemplary accessible database 330.

Next, at 212, GUI element generation program 150 may identify a first GUI element displayed by the connected application based on the detected query. At this step, GUI element generation program 150 functionally identifies a first generic or default GUI element that the connected consumer application associates with the received query. This identified first GUI element will serve as the candidate GUI element for being modified or transformed by GUI element generation program 150. In embodiments, GUI element generation program 150 may identify the first GUI element based on identifying a first GUI element within the connected application associated with the interest topic identified at step 208 (by leveraging the above-described natural language processing tools and techniques). Returning to the example above, for exemplary query 'Q1' stating 'Italian Cuisine near me', GUI element generation program 150 may, at this step, identify a first GUI element 'E1' within the connected application 'C1' associated with the interest topic of 'restaurants. 'E1' may include, for example, a first generic GUI element including a logo depicting dining utensils, such as a fork and knife.

At 214, GUI element generation program 150 may then generate, using a generative adversarial network (GAN), a custom GUI element based on the highest-prioritized key term. At this step GUI element generation program 150 may leverage an exemplary custom GUI element generation module 350, as shown in FIG. 3, to input the highest-prioritized key term into a GAN of the GUI generation module 350 to generate a custom and personalized GUI element tailored to the detected user item interests, the vendors priorities, or both. This is because the highest-prioritized term is, as discussed above, determined based upon the detected user item interests and digital behaviors, the vendor's priorities, or both. At this step, the custom GUI element may be generated by using the GAN to modify the detected first GUI element from step 212, essentially using the first GUI element as a starting point for generating the custom GUI element. In some embodiments, GUI generation module 350 of GUI element generation program 150 may be configured to leverage generative artificial intelligence (generative AI) to generate the custom GUI element based on the highest-prioritized key terms. Returning to the example above, GUI element generation program 150 may input the highest-prioritized key term for exemplary query 'Q1', in this case the key term 'pizza', into a GAN of GUI element generation module 350 to generate a custom GUI element 'Custom E1'. 'Custom E1' may generally represent a logo including an image related to a pizza, as the key term input into the GAN was 'pizza'.

Thereafter at 216, GUI element generation program 150 may replace the first GUI element with the custom GUI element. In embodiments, GUI element generation program 150 may be further configured to use suitable supervised machine learning algorithms, such as for example, logistic regressions to calculate the engagement confidence level. In the context of this disclosure, the calculated engagement confidence level may refer to a prediction of user engagement corresponding to the generated custom GUI element. In embodiments, GUI element generation program 150 may include a predetermined confidence threshold. In embodiments, the first GUI element may be replaced with the generated custom GUI element in response to calculating an engagement confidence level above a predetermined threshold. For example, in such embodiments, if GUI element generation program 150 calculates a confidence level for an exemplary custom GUI element that meets or exceeds the included predetermined confidence threshold, then the custom GUI element may replace the detected first GUI element (the generic GUI element) from the connected application with the generated custom GUI element. Returning to the example discussed above, GUI element generation program 150 may, at this step, replace the generic GUI element 'E1' with the generated custom GUI element 'Custom E1'. Thus, the generic logo or icon 'E1' including the dining utensils including a fork and knife, would be replaced with the custom GUI element 'Custom E1' including an image with a pizza. Accordingly, the custom GUI element is one that corresponds to an item that is more appealing to the user based on historical personalized user data and is further associated with vendor priorities based on advertisement spending and desired user interaction paths. Thus, the user is more likely to interact with the application based on the customized logo.

In embodiments, GUI element generation program 150 may further include a feedback module 360, as shown in FIG. 3. Feedback module 360 of GUI element generation program 150 may be configured to collect and store data related to user behavior to provide iterative feedback to improve confidence score accuracy over time. The collected data from this step may be stored within accessible database 330.

It will be appreciated that GUI element generation program 150 thus provides for improved methods for using computers to generate and modify graphical user interface elements based on user item interests, or in some embodiments, based on vendor priorities. By determining highest prioritized key terms, described embodiments can leverage a GAN to generate customized GUI elements that are more effective, and that are more specific to involved users and vendors. This may allow for generic GUI elements to automatically be replaced with more effective customized GUI elements to drive increased amounts of desired user behavior (click through rates, conversion rates, etc.) and improved business outcomes. The automated nature of the described embodiments further eliminates the time and significant costs associated with manual generation of GUI elements.

It may be appreciated that FIGS. 2-3 provide only illustrations of an exemplary implementations and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating and modifying graphical user interface (GUI) elements, the method comprising:
   detecting and authenticating a user interacting with a connected application;
   determining item interests of the user based on at least one or more of user purchase history, user interests, and user digital behaviors;
   generating and storing a personalized user profile based on the determined item interests of the user, wherein the personalized user profile includes a list of user items of interest and associated keywords, the personalized user profile being updated in real-time based on user interaction data from the connected application;
   in response to detecting a query made by the user, extracting from the detected query interest topics, subject matter, and a series of associated key terms;
   determining a highest-prioritized key term within the series of associated key terms;
   identifying a first GUI element displayed by the connected application based on the detected query;
   generating, using a generative adversarial network (GAN), a custom GUI element based on the highest-prioritized key term; and
   replacing the first GUI element with the generated custom GUI element.

2. The computer-based method of claim 1, wherein generating and storing the personalized user profile based on the determined item interests of the user, wherein the personalized user profile includes the list of the user items of interest and the associated keywords further comprises:
   leveraging machine learning techniques including one or more of k-means clustering, hierarchical clustering, decision tree learning, random forest algorithms, and support vector machines to further process data associated with the determined item interests of the user.

3. The computer-based method of claim 1, wherein the generated personalized user profile is stored on an accessible database in JSON format.

4. The computer-based method of claim 1, further comprising:
   leveraging natural language processing techniques comprising one or more of latent Dirichlet Allocation (LDA), Latent Semantic Analysis (LSA), Word2Vec and GloVe to extract the query interest topics, the subject matter, and the series of associated key terms from the detected query.

5. The computer-based method of claim 1, wherein the GAN leverages generative artificial intelligence to generate the custom GUI element.

6. The computer-based method of claim 1, further comprising:
   calculating the engagement confidence level for the generated custom GUI element using machine learning algorithms, the calculated engagement confidence level being indicative of a predicted user engagement level corresponding to the generated custom GUI element, wherein the first GUI element is replaced with the custom GUI element in response to calculating an engagement confidence level that exceeds a predetermined confidence threshold.

7. The computer-based method of claim 6, further comprising:
   employing a feedback module to monitor and leverage user data to iteratively improve the calculated engagement confidence levels over time.

8. A computer system, the computer system comprising:
   one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
   detecting and authenticating a user interacting with a connected application;
   determining item interests of the user based on at least one or more of user purchase history, user interests, and user digital behaviors;
   generating and storing a personalized user profile based on the determined item interests of the user, wherein the personalized user profile includes a list of user items of interest and associated keywords, the personalized user profile being updated in real-time based on user interaction data from the connected application;
   in response to detecting a query made by the user, extracting from the detected query interest topics, subject matter, and a series of associated key terms;
   determining a highest-prioritized key term within the series of associated key terms;
   identifying a first GUI element displayed by the connected application based on the detected query;
   generating, using a generative adversarial network (GAN), a custom GUI element based on the highest-prioritized key term; and
   replacing the first GUI element with the generated custom GUI element.

9. The computer system of claim 8, wherein generating and storing the personalized user profile based on the determined item interests of the user, wherein the personalized user profile includes the list of the user items of interest and the associated keywords further comprises:

leveraging machine learning techniques including one or more of k-means clustering, hierarchical clustering, decision tree learning, random forest algorithms, and support vector machines to further process data associated with the determined item interests of the user.

10. The computer system of claim 8, wherein the generated personalized user profile is stored on an accessible database in JSON format.

11. The computer system of claim 8, further comprising:
leveraging natural language processing techniques comprising one or more of latent Dirichlet Allocation (LDA), Latent Semantic Analysis (LSA), Word2Vec and GloVe to extract the query interest topics, the subject matter, and the series of associated key terms from the detected query.

12. The computer system of claim 8, wherein the GAN leverages generative artificial intelligence to generate the custom GUI element.

13. The computer system of claim 8, further comprising:
calculating the engagement confidence level for the generated custom GUI element using machine learning algorithms, the calculated engagement confidence level being indicative of a predicted user engagement level corresponding to the generated custom GUI element, wherein the first GUI element is replaced with the custom GUI element in response to calculating an engagement confidence level that exceeds a predetermined confidence threshold.

14. The computer system of claim 13, further comprising:
employing a feedback module to monitor and leverage user data to iteratively improve the calculated engagement confidence levels over time.

15. A computer program product, the computer program product comprising:
one or more computer-readable tangible storage medium and program instructions stored on at least one of the one or more computer-readable tangible storage medium, the program instructions executable by a processor capable of performing a method, the method comprising:
detecting and authenticating a user interacting with a connected application;
determining item interests of the user based on at least one or more of user purchase history, user interests, and user digital behaviors;
generating and storing a personalized user profile based on the determined item interests of the user, wherein the personalized user profile includes a list of user items of interest and associated keywords, the personalized user profile being updated in real-time based on user interaction data from the connected application;
in response to detecting a query made by the user, extracting from the detected query interest topics, subject matter, and a series of associated key terms;
determining a highest-prioritized key term within the series of associated key terms;
identifying a first GUI element displayed by the connected application based on the detected query;
generating, using a generative adversarial network (GAN), a custom GUI element based on the highest-prioritized key term; and
replacing the first GUI element with the generated custom GUI element.

16. The computer program product of claim 15, wherein generating and storing the personalized user profile based on the determined item interests of the user, wherein the personalized user profile includes the list of the user items of interest and the associated keywords further comprises:
leveraging machine learning techniques including one or more of k-means clustering, hierarchical clustering, decision tree learning, random forest algorithms, and support vector machines to further process data associated with the determined item interests of the user.

17. The computer program product of claim 15, wherein the generated personalized user profile is stored on an accessible database in JSON format.

18. The computer program product of claim 15, further comprising:
leveraging natural language processing techniques comprising one or more of latent Dirichlet Allocation (LDA), Latent Semantic Analysis (LSA), Word2Vec and GloVe to extract the query interest topics, the subject matter, and the series of associated key terms from the detected query.

19. The computer program product of claim 15, wherein the GAN leverages generative artificial intelligence to generate the custom GUI element.

20. The computer program product of claim 15, further comprising:
calculating the engagement confidence level for the generated custom GUI element using machine learning algorithms, the calculated engagement confidence level being indicative of a predicted user engagement level corresponding to the generated custom GUI element, wherein the first GUI element is replaced with the custom GUI element in response to calculating an engagement confidence level that exceeds a predetermined confidence threshold.

\* \* \* \* \*